(12) United States Patent
Isshiki et al.

(10) Patent No.: US 12,145,417 B2
(45) Date of Patent: Nov. 19, 2024

(54) SUSPENSION CONTROL DEVICE AND SUSPENSION DEVICE

(71) Applicant: Hitachi Astemo, Ltd., Hitachinaka (JP)

(72) Inventors: Ken Isshiki, Hitachinaka (JP); Noal Van Nguyen, Hitachinaka (JP); Kyoichi Tagami, Hitachinaka (JP)

(73) Assignee: Hitachi Astemo, Ltd., Hitachinaka (JP)

(*) Notice: Subject to any disclaimer, the term of this patent is extended or adjusted under 35 U.S.C. 154(b) by 220 days.

(21) Appl. No.: 17/838,494

(22) Filed: Jun. 13, 2022

(65) Prior Publication Data

US 2022/0314729 A1 Oct. 6, 2022

Related U.S. Application Data

(63) Continuation of application No. PCT/JP2020/003399, filed on Jan. 30, 2020.

(30) Foreign Application Priority Data

Jan. 30, 2020 (JP) ................. 2020-013084

(51) Int. Cl.
*B60G 17/015* (2006.01)
*B60G 17/016* (2006.01)
(Continued)

(52) U.S. Cl.
CPC ......... *B60G 17/08* (2013.01); *B60G 17/0152* (2013.01); *B60G 17/0162* (2013.01);
(Continued)

(58) Field of Classification Search
CPC .......... B60G 17/015; B60G 17/0152; B60G 17/016; B60G 17/0162; B60G 17/0164;
(Continued)

(56) References Cited

U.S. PATENT DOCUMENTS

2004/0024504 A1  2/2004 Salib et al.
2007/0156314 A1  7/2007 Tomida
(Continued)

FOREIGN PATENT DOCUMENTS

JP  2007170590 A  7/2007
JP  2010215153 A  9/2010
JP  2011031795 A  2/2011

OTHER PUBLICATIONS

International Search Report mailed Apr. 14, 2020 for the corresponding International Patent Application No. PCT/JP2020/003399, 7 pages including English translation.
(Continued)

*Primary Examiner* — Erick R Solis
(74) *Attorney, Agent, or Firm* — Leason Ellis LLP; Edward J. Ellis; Melvin C. Garner

(57) ABSTRACT

A technology can be realized which increases the sense of unity with a vehicle that is felt by a driver. A suspension control device, which controls the damping force of the suspension of a vehicle, comprises a target control amount calculation unit which sets a target control amount, that is referenced when controlling the damping force of the suspension, such that the period of the phase of the roll angle and the period of the phase of the pitch angle of the vehicle approach a synchronized state, such that the magnitude of the expansion-side damping force is greater than the magnitude of the contraction-side damping force on the front-wheel-side of the vehicle, and such that the contraction-side damping force is greater than or equal to the expansion-side damping force on the rear-wheel-side of the vehicle.

14 Claims, 10 Drawing Sheets

(51) Int. Cl.
*B60G 17/019* (2006.01)
*B60G 17/08* (2006.01)

(52) U.S. Cl.
CPC .................. *B60G 17/01908* (2013.01); *B60G 2400/0511* (2013.01); *B60G 2400/0512* (2013.01); *B60G 2400/0521* (2013.01); *B60G 2400/0522* (2013.01); *B60G 2500/104* (2013.01)

(58) Field of Classification Search
CPC ........ B60G 17/01908; B60G 17/01916; B60G 17/01925; B60G 17/08; B60G 2400/0511; B60G 2400/0512; B60G 2400/0521; B60G 2400/0522; B60G 2400/252; B60G 2500/104
USPC ...................................................... 701/37, 38
See application file for complete search history.

(56) References Cited

U.S. PATENT DOCUMENTS

| | | | |
|---|---|---|---|
| 2008/0290618 A1* | 11/2008 | Yanaka | B60G 17/0195 280/6.15 |
| 2010/0076649 A1* | 3/2010 | Lyoda | B60G 17/08 701/38 |
| 2010/0191420 A1* | 7/2010 | Honma | B60G 17/0162 701/38 |
| 2011/0035089 A1 | 2/2011 | Hirao et al. | |

OTHER PUBLICATIONS

Written Opinion mailed Apr. 14, 2020 for the corresponding International Patent Application No. PCT/JP2020/003399, 4 pages.

* cited by examiner

SUSPENSION CONTROL DEVICE AND SUSPENSION DEVICE

CROSS REFERENCE TO RELATED APPLICATIONS

This application is a continuation of International Patent Application No. PCT/JP2020/003399 filed on Jan. 30, 2020 and claims the benefit of priority to Japanese Patent Application No. 2020-013084 filed on Jan. 30, 2020, the contents of all of which are incorporated herein by reference in their entireties.

FIELD OF THE INVENTION

The present invention relates to a suspension control device and a suspension device.

BACKGROUND OF THE INVENTION

In controlling a traveling state of a vehicle, from a viewpoint of enhancing safety in traveling of the vehicle, a control for synchronizing roll and pitch as a vehicle motion by using technique of controlling a brake or a suspension is disclosed (see, for example, US 2004/0024504 A).

Patent Literature 1: US 2004/0024504 A

However, the above-described patent literature does not disclose a specific control method for the control for synchronizing the roll and the pitch.

An aspect of the present invention is to realize control of a suspension capable of synchronizing roll and pitch of a vehicle.

SUMMARY OF THE INVENTION

To solve the problem described above, a suspension control device according to an aspect of the present invention which controls a damping force of a suspension of a vehicle, includes a target control amount calculation portion which sets a target control amount referred to when controlling the damping force of the suspension such that a cycle of a phase of a roll angle of the vehicle and a cycle of a phase of a pitch angle of the vehicle approach a synchronous state, a magnitude of a damping force on an extension side is larger than a magnitude of a damping force on a contraction side on a front wheel side of the vehicle, and a magnitude of a damping force on a contraction side is equal to or larger than a magnitude of a damping force on an extension side on a rear wheel side of the vehicle.

To solve the problem described above, a suspension device according to another aspect of the present invention includes a suspension of a vehicle and a control portion which controls a damping force of the suspension, where the control portion includes a target control amount calculation portion which sets a target control amount referred to when controlling the damping force of the suspension such that a cycle of a phase of a roll angle of the vehicle and a cycle of a phase of a pitch angle of the vehicle approach a synchronous state, a magnitude of a damping force on an extension side is larger than a magnitude of a damping force on a contraction side on a front wheel side of the vehicle, and a magnitude of a damping force on a contraction side is equal to or larger than a magnitude of a damping force on an extension side on a rear wheel side of the vehicle.

According to the aspects of the present invention, it is possible to easily create a pitch angle of a vehicle body, and it is possible to improve responsiveness of control.

DETAILED DESCRIPTION OF THE INVENTION

First Embodiment

Hereinafter, a first embodiment of the present invention will be described in detail.

[Configuration of Vehicle]

Figure 1:
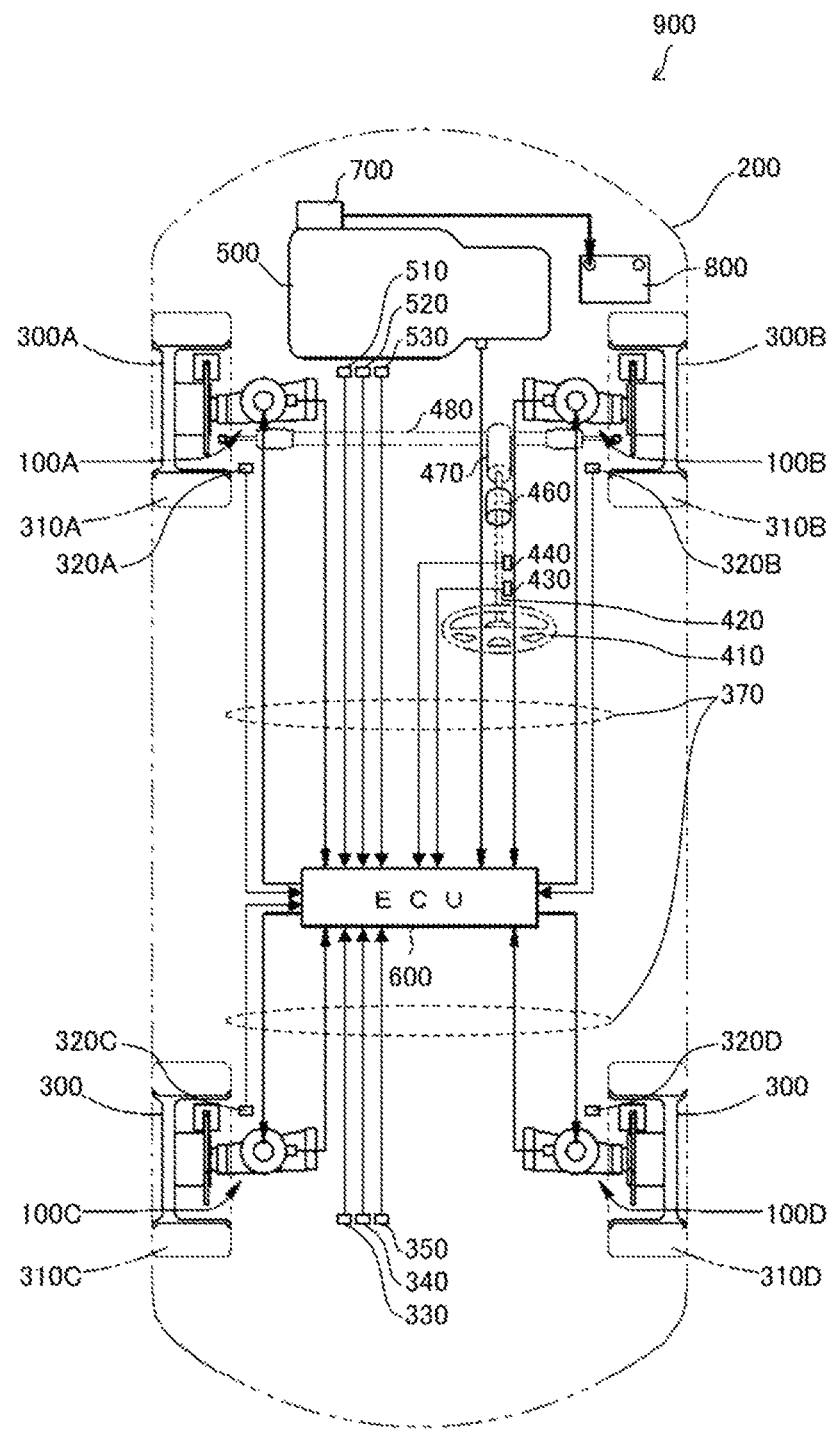
FIG. 1 is a diagram schematically illustrating an example of a configuration of a vehicle according to a first embodiment of the present invention.

FIG. 1 is a diagram schematically illustrating an example of a configuration of a vehicle 900 according to the present embodiment. As illustrated in FIG. 1, the vehicle 900 includes a suspension apparatus (suspension) 100, a vehicle body 200, a vehicle wheel 300, a tire 310, a steering member 410, a steering shaft 420, a torque sensor 430, a steering angle sensor 440, a torque application portion 460, a rack and pinion mechanism 470, a rack shaft 480, an engine 500, an electronic control unit (ECU) (control device, control portion) 600, an electric power generation device 700, and a battery 800. Here, the suspension apparatus 100 and the ECU 600 configure a suspension device according to the present embodiment.

The vehicle wheel 300 on which the tire 310 is mounted is suspended from the vehicle body 200 by the suspension apparatus 100. Since the vehicle 900 is a four-wheeled vehicle, the suspension apparatus 100, the vehicle wheel 300, and the tire 310 are provided on each of the four wheels.

The tires and vehicle wheels of a left front wheel, a right front wheel, a left rear wheel, and a right rear wheel are also referred to as a tire 310A and a vehicle wheel 300A, a tire 310B and a vehicle wheel 300B, a tire 310C and a vehicle wheel 300C, and a tire 310D and a vehicle wheel 300D, respectively. Hereinafter, similarly, configurations attached to the left front wheel, the right front wheel, the left rear wheel, and the right rear wheel may be represented by adding the reference letters "A", "B", "C", and "D".

The suspension apparatus 100 includes a hydraulic shock absorber (absorber), an upper arm, and a lower arm. Further, as an example, the hydraulic shock absorber includes a solenoid valve which is an electromagnetic valve for adjusting a damping force generated by the hydraulic shock absorber. However, the present embodiment is not limited to this, and the hydraulic shock absorber may use an electromagnetic valve other than the solenoid valve as the electromagnetic valve for adjusting the damping force. For example, the hydraulic shock absorber may adopt a configuration in which an electromagnetic valve using an electromagnetic fluid (magnetic fluid) is provided as the electromagnetic valve described above.

The electric power generation device 700 is attached to the engine 500, and the electric power generated by the electric power generation device 700 is stored in the battery 800.

The steering member 410 operated by a driver is connected to one end of the steering shaft 420 so as to be able to transmit torque, and the other end of the steering shaft 420 is connected to the rack and pinion mechanism 470.

The rack and pinion mechanism 470 is a mechanism for converting a rotation of the steering shaft 420 around an axis into a displacement along an axial direction of the rack shaft 480. When the rack shaft 480 is displaced in the axial direction, the vehicle wheel 300A and the vehicle wheel 300B are steered via a tie rod and a knuckle arm.

The torque sensor 430 detects a steering torque applied to the steering shaft 420, in other words, a steering torque applied to the steering member 410, and provides the ECU 600 with a torque sensor signal indicating a detection result. More specifically, the torque sensor 430 detects a twist of a torsion bar built in the steering shaft 420 and outputs a detection result as the torque sensor signal. As the torque sensor 430, a well-known sensor such as a Hall IC, an MR element, or a magnetostrictive torque sensor may be used.

The steering angle sensor 440 detects a steering angle of the steering member 410 and provides a detection result to the ECU 600.

The torque application portion 460 applies an assist torque or a reaction torque according to a steering control amount supplied from the ECU 600 to the steering shaft 420. The torque application portion 460 includes a motor which generates the assist torque or the reaction torque according to the steering control amount, and a torque transmission mechanism which transmits the torque generated by the motor to the steering shaft 420.

In the above description, "connected so as to be able to transmit torque" means that members are connected so that a rotation of one member causes a rotation of the other member. For example, at least a case where one member and the other member are integrally molded, a case where one member is directly or indirectly fixed to the other member, and a case where one member and the other member are connected so as to be interlocked with each other via a joint member or the like are included.

Further, in the example described above, a steering device in which the steering member 410 to the rack shaft 480 are always mechanically connected is taken as an example, but the present embodiment is not limited to this. For example, a steering device according to the present embodiment may be, for example, a steering device of a steer-by-wire type. The matters described below in this specification can also be applied to the steering device of the steer-by-wire type.

The ECU 600 collectively controls various electronic devices included in the vehicle 900. For example, the ECU 600 controls a magnitude of the assist torque or reaction torque applied to the steering shaft 420 by adjusting the steering control amount supplied to the torque application portion 460.

Further, the ECU 600 controls an opening and closing of a solenoid valve by supplying a suspension control amount to the solenoid valve included in the hydraulic shock absorber included in the suspension apparatus 100. In order to enable this control, an electric power line for supplying drive power from the ECU 600 to the solenoid valve is arranged.

Also, the vehicle 900 includes a vehicle wheel speed sensor 320 which is installed for each vehicle wheel 300 and detects a vehicle wheel speed of each vehicle wheel 300, a lateral G sensor 330 which detects a lateral acceleration of the vehicle 900, a front-rear G sensor 340 which detects a front-rear acceleration of the vehicle 900, a yaw rate sensor 350 which detects a yaw rate of the vehicle 900, an engine torque sensor 510 which detects a torque generated by the engine 500, an engine speed sensor 520 which detects a speed of the engine 500, and a brake pressure sensor 530 which detects a pressure applied to a brake fluid of a brake device. Detection results of these various sensors are supplied to the ECU 600.

Although not illustrated, the vehicle 900 includes an antilock brake system (ABS) which is a system to prevent a vehicle wheel lock during braking, a traction control system (TCS) which suppresses slipping of the vehicle wheel during acceleration, or the like, and a vehicle stability assist (VSA) controllable braking device which is a vehicle behavior stabilization control system equipped with an automatic braking function for a yaw moment control or a brake assist function during turning.

Here, the ABS, the TCS, and the VSA compare a vehicle wheel speed determined according to an estimated vehicle body speed with the vehicle wheel speed detected by the vehicle wheel speed sensor 320, and then the ABS, the TCS, and the VSA determine that the vehicle is in a slip state when the values of these two vehicle wheel speeds differ by a predetermined value or more. Through such processing, the ABS, the TCS, and the VSA aim to stabilize a behavior of the vehicle 900 by performing an optimum brake control or traction control according to a traveling state of the vehicle 900.

Further, the supply of the detection results by the various sensors described above to the ECU 600 and the transmission of the control signal from the ECU 600 to each part are performed via a controller area network (CAN) 370.

[Suspension Control Portion]

Hereinafter, the ECU 600 will be specifically described by changing the reference drawing. The ECU 600 includes a suspension control portion 650. The ECU 600 is one aspect of the suspension control device of the present embodiment.

The suspension control portion 650 refers to the detection results of various sensors included in the CAN 370, and determines a magnitude of the suspension control amount supplied to a solenoid valve included in the hydraulic shock absorber included in the suspension apparatus 100. A process of "determining the magnitude of the control amount" includes a case where the magnitude of the control amount is set to zero, that is, the control amount is not supplied.

Figure 2:
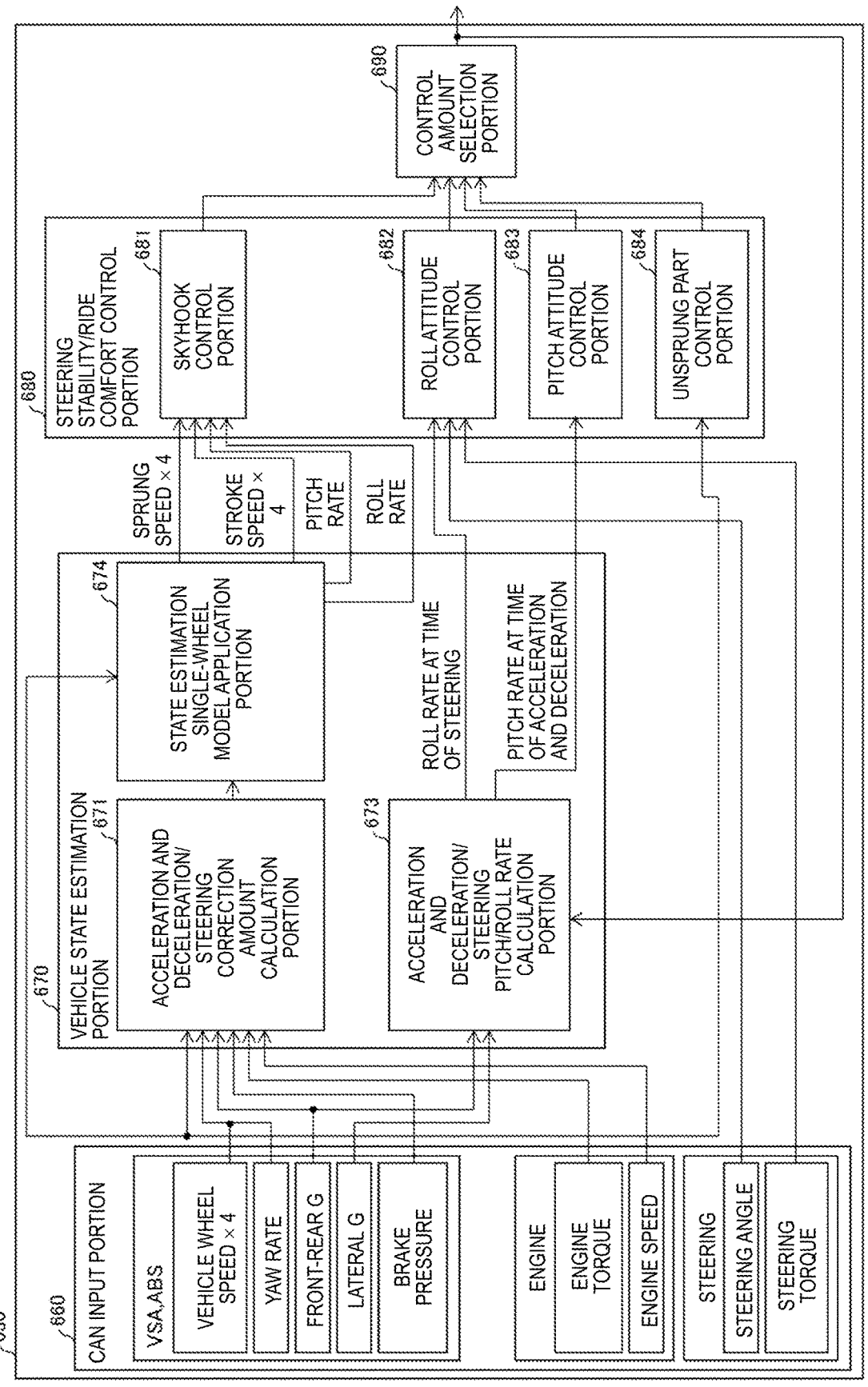
FIG. 2 is a block diagram illustrating an example of a functional configuration of a suspension control portion according to the first embodiment of the present invention.

Next, the suspension control portion 650 will be described more specifically with reference to FIG. 2. FIG. 2 is a block diagram illustrating an example of a functional configuration of the suspension control portion 650.

As illustrated in FIG. 2, the suspension control portion 650 includes a CAN input portion 660, a vehicle state estimation portion 670, a steering stability/ride comfort control portion 680, and a control amount selection portion 690.

The CAN input portion 660 acquires various signals via the CAN 370. For example, as illustrated in FIG. 2, the CAN input portion 660 acquires the following signals (parentheses indicate an acquisition source).

Vehicle wheel speeds of four wheels (vehicle wheel speed sensor 320A to 320D)
Yaw rate (yaw rate sensor 350)
Front-rear G (front-rear G sensor 340)
Lateral G (lateral G sensor 330)
Brake pressure (brake pressure sensor 530)
Engine torque (engine torque sensor 510)
Engine speed (engine speed sensor 520)
Steering angle (steering angle sensor 440)
Steering torque (torque sensor 430)

The vehicle state estimation portion 670 estimates a state of the vehicle 900 with reference to various signals acquired by the CAN input portion 660. The vehicle state estimation portion 670 outputs sprung speeds of the four wheels, stroke speeds (suspension stroke speeds) of the four wheels, a pitch rate, a roll rate, a roll rate at the time of steering, and a pitch rate at the time of acceleration/deceleration as the estimation results.

As illustrated in FIG. 2, the vehicle state estimation portion 670 includes an acceleration and deceleration/steering correction amount calculation portion 671, an acceleration and deceleration/steering pitch/roll rate calculation portion 673, and a state estimation single-wheel model application portion 674.

The acceleration and deceleration/steering correction amount calculation portion 671 calculates a vehicle body front-rear speed, an inner and outer wheel difference ratio, and an adjustment gain with reference to the yaw rate, the front-rear G, the vehicle wheel speeds of the four wheels, the brake pressure, the engine torque, and the engine speed, and then the acceleration and deceleration/steering correction amount calculation portion 671 supplies the calculation results to the state estimation single-wheel model application portion 674.

The acceleration and deceleration/steering pitch/roll rate calculation portion 673 calculates the roll rate at the time of steering and the pitch rate at the time of acceleration/deceleration with reference to the front-rear G and the lateral G. The calculation results are supplied to the steering stability/ride comfort control portion 680.

The acceleration and deceleration/steering pitch/roll rate calculation portion 673 may be configured to further refer to the suspension control amount output by the control amount selection portion 690. Further, the roll rate value may be configured to take "0" as a reference value when an inclination of the vehicle 900 does not change for a predetermined minute time, and may represent a roll rate as a deviation from the reference value. Further, the acceleration and deceleration/steering pitch/roll rate calculation portion 673 may provide a dead zone of about ±0.5 in the roll rate at the time of steering. Here, the sign is, for example, "+" on a left side of the vehicle 900 and "−" on a right side.

The state estimation single-wheel model application portion 674 applies a one-wheel model for state estimation to each wheel with reference to the calculation results by the acceleration and deceleration/steering correction amount calculation portion 671, and calculates the sprung speeds of the four wheels, the stroke speeds of the four wheels, the pitch rate, and the roll rate. The calculation results are supplied to the steering stability/ride comfort control portion 680.

The steering stability/ride comfort control portion 680 includes a skyhook control portion 681, a roll attitude control portion 682, a pitch attitude control portion 683, and an unsprung part control portion 684.

The skyhook control portion 681 performs a ride comfort control (vibration suppression control) which suppresses a shaking of the vehicle when riding over unevenness of a road surface and enhances ride comfort. As an example, the skyhook control portion 681 determines a skyhook target control amount with reference to the sprung speeds of the four wheels, the stroke speeds of the four wheels, the pitch rate, and the roll rate, and supplies the result to the control amount selection portion 690.

As a more specific example, the skyhook control portion 681 sets a damping force base value by referring to a sprung-damping force map based on the sprung speed. Further, the skyhook control portion 681 calculates a skyhook target damping force by multiplying the set damping force base value by a skyhook gain. Then, the skyhook target control amount is determined based on the skyhook target damping force and the stroke speed.

The roll attitude control portion 682 controls a roll attitude by calculating a roll attitude target control amount with reference to the roll rate at the time of steering, a steering angle signal indicating the steering angle, and a steering torque signal indicating the steering torque. The calculated roll attitude target control amount is supplied to the control amount selection portion 690. A specific configuration of the roll attitude control portion 682 will be described below.

The pitch attitude control portion 683 controls a pitch with reference to the pitch rate at the time of acceleration and deceleration, determines the pitch target control amount, and supplies the result to the control amount selection portion 690.

The unsprung part control portion 684 controls the unsprung vibration suppression of the vehicle 900 with reference to the vehicle wheel speeds of the four wheels, and determines an unsprung vibration suppression control target control amount. The determination result is supplied to the control amount selection portion 690.

The control amount selection portion 690 selects a target control amount having the highest value among the skyhook target control amount, the roll attitude target control amount, the pitch target control amount, and the unsprung vibration suppression control target control amount, and outputs the selected target control amount as the suspension control amount.

[Roll Attitude Control Portion]

Figure 3:
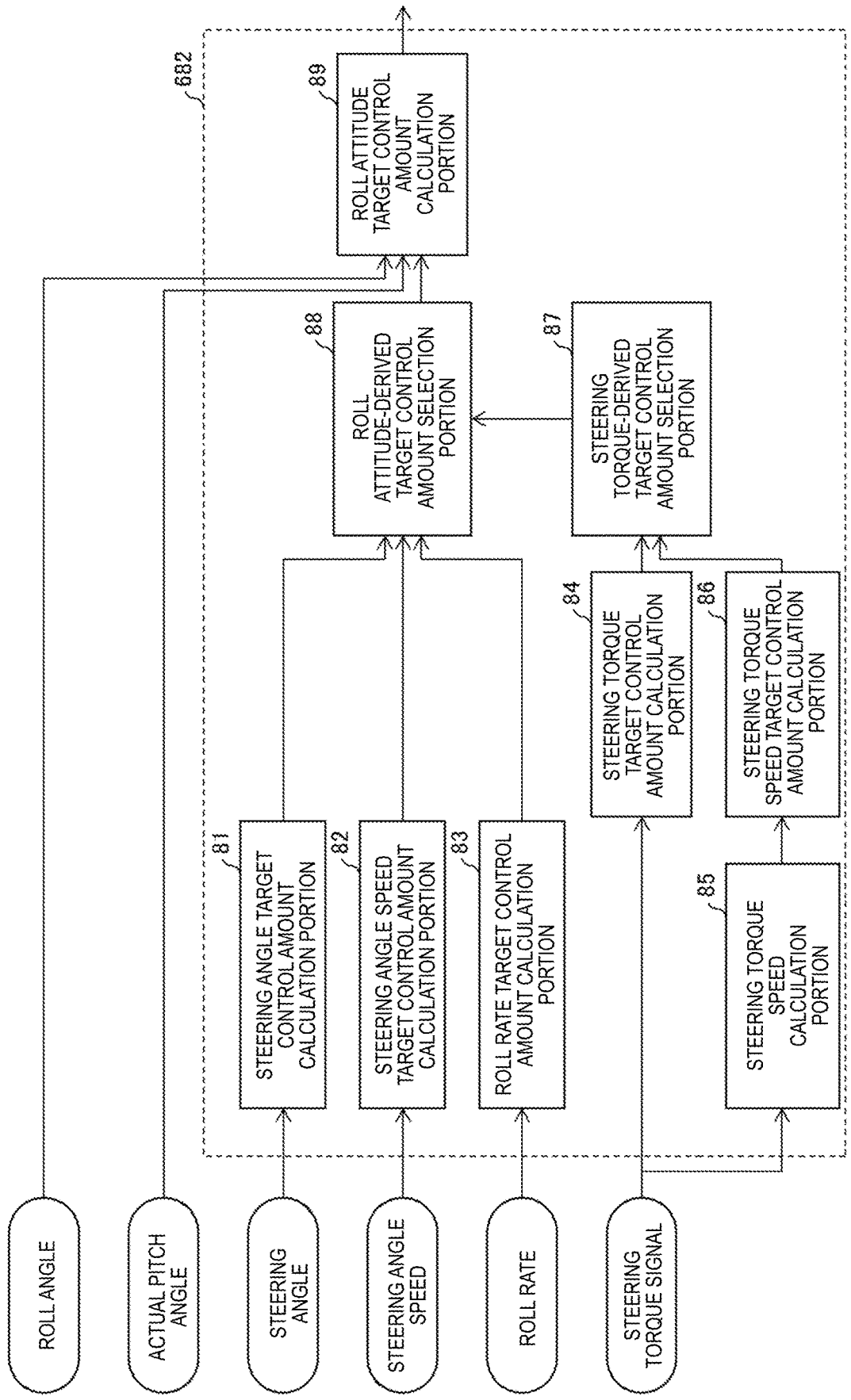
FIG. 3 is a block diagram illustrating an example of a functional configuration of a roll attitude control portion according to the first embodiment of the present invention.

In the following, the roll attitude control portion 682 will be described more specifically with reference to FIG. 3. FIG. 3 is a block diagram illustrating an example of a functional configuration of the roll attitude control portion 682 according to the present embodiment. The roll attitude control portion 682 calculates the roll attitude target control amount with reference to a roll angle signal, an actual pitch angle signal, the steering angle signal, a steering angle speed signal, a roll rate signal, and the steering torque signal.

Here, as the roll angle signal referred to by the roll attitude control portion 682, for example, the vehicle 900 may be configured to include a roll angle sensor, and the output from the roll angle sensor may be used as the roll angle signal, but the present invention is not limited to this. For example, the roll rate calculated by the vehicle state estimation portion 670 may be configured to be integrated by the vehicle state estimation portion 670, and the roll angle obtained by the integration may be configured to be used as the roll angle signal.

Further, as the actual pitch angle signal referred to by the roll attitude control portion 682, for example, the vehicle 900 may be configured to include a pitch angle sensor, and the output from the pitch angle sensor may be configured to be used as the pitch angle signal, but the present invention is not limited to this. For example, the pitch rate calculated by the vehicle state estimation portion 670 may be configured to be integrated by the vehicle state estimation portion 670, and the pitch angle obtained by the integration may be configured to be used as the actual pitch angle signal.

Further, as the steering angle speed signal referred to by the roll attitude control portion 682, the steering angle signal output by the CAN input portion 660 may be configured to be differentiated by, for example, steering stability/ride comfort control portion 680, and the steering angle speed obtained by the differentiation may be configured to be used as the steering angle speed signal.

Here, the roll attitude target control amount can be a target control amount that is a candidate for the suspension control amount, in other words, a target control amount that is referred to when controlling the damping force of the suspension. For example, the roll attitude target control amount calculated by the roll attitude control portion 682 can be a suspension control amount when selected by the control amount selection portion 690. Therefore, it can be expressed that the roll attitude control portion 682 calculates the suspension control amount.

As illustrated in FIG. 3, the roll attitude control portion 682 includes a steering angle target control amount calculation portion 81, a steering angle speed target control amount calculation portion 82, a roll rate target control amount calculation portion 83, a steering torque target control amount calculation portion 84, a steering torque speed calculation portion 85, a steering torque speed target control amount calculation portion 86, a steering torque-derived target control amount selection portion 87, a roll attitude-derived target control amount selection portion 88, and a roll attitude target control amount calculation portion 89.

The steering angle target control amount calculation portion 81 calculates a steering angle target control amount with reference to the steering angle indicated by the steering angle signal. The steering angle speed target control amount calculation portion 82 calculates a steering angle speed target control amount with reference to the steering angle speed signal. Both the steering angle target control amount calculation portion 81 and the steering angle speed target control amount calculation portion 82 refer to the steering angle signal to suppress roll of the vehicle 900 and calculate the target control amount so that attitude of the vehicle 900 becomes closer to flat.

The roll rate target control amount calculation portion 83 calculates a roll rate target control amount with reference to the roll rate at the time of steering supplied from the acceleration and deceleration/steering pitch/roll rate calculation portion 673.

The steering torque target control amount calculation portion 84 calculates a steering torque target control amount with reference to the steering torque signal indicated by the steering torque signal. The steering torque speed calculation portion 85 calculates a steering torque speed by referring to a time change of the steering torque indicated by the steering torque signal. The steering torque speed target control amount calculation portion 86 calculates a steering torque speed target control amount with reference to the steering torque speed calculated by the steering torque speed calculation portion 85 for each of the four wheels of the vehicle 900.

In this way, both the steering torque target control amount calculation portion 84 and the steering torque speed target control amount calculation portion 86 directly or indirectly refer to the steering torque signal to calculate the target control amount so that the roll of the vehicle 900 is suppressed and the attitude of the vehicle 900 becomes closer to flat.

The steering torque-derived target control amount selection portion 87 selects a target control amount having a higher value among the steering torque target control amount and the steering torque speed target control amount as a steering torque-derived target control amount.

The roll attitude-derived target control amount selection portion 88 selects a target control amount having a higher value among the steering angle target control amount, the steering angle speed target control amount, the roll rate target control amount, and the steering torque-derived target control amount as a roll attitude-derived target control amount.

(Roll Attitude Target Control Amount Calculation Portion)

The roll attitude target control amount calculation portion 89 is an example of a target control amount calculation portion described in the claims. The roll attitude target control amount calculation portion 89 sets the target control amount referred to when controlling the damping force of the suspension so as to satisfy the following conditions.

A cycle of a phase of a roll angle of the vehicle 900 and a cycle of a phase of a pitch angle of the vehicle 900 approach a synchronous state.

On a front wheel side of the vehicle 900, a magnitude of a damping force on an extension side is larger than a magnitude of a damping force on a contraction side.

On a rear wheel side of the vehicle 900, a magnitude of a damping force on a contraction side is equal to or larger than a magnitude of a damping force on an extension side.

A suspension control method in the present embodiment will be described below.

Figure 4:
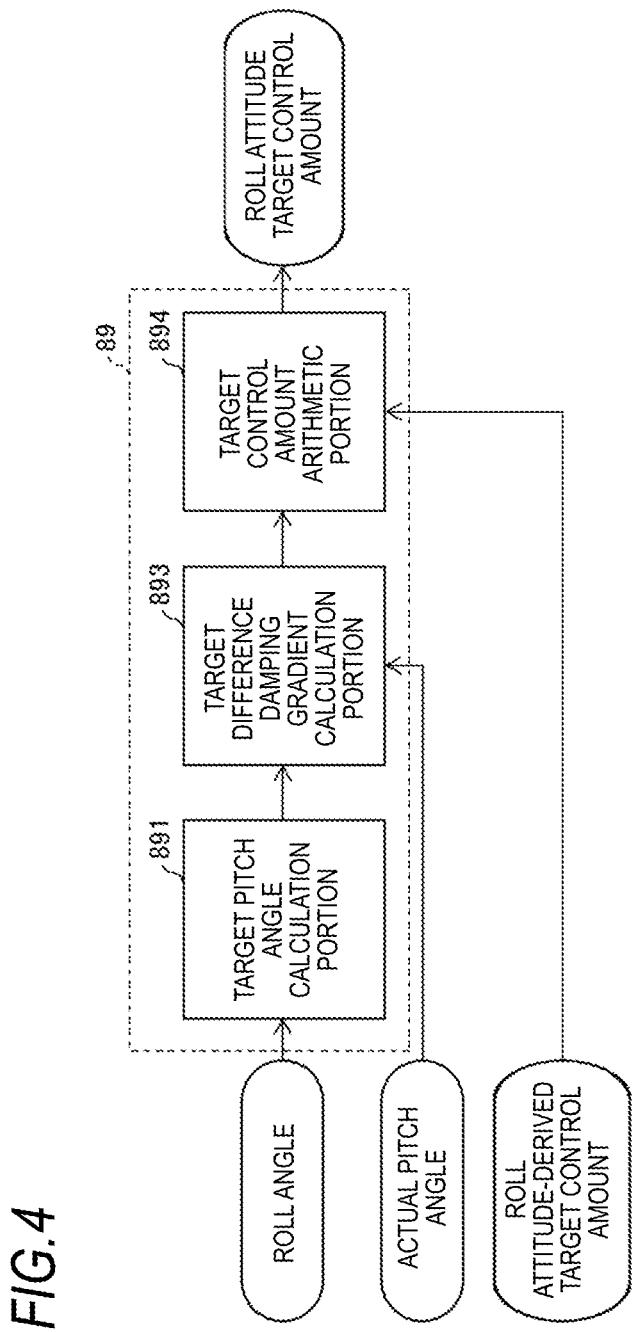
FIG. 4 is a block diagram illustrating an example of a functional configuration of a roll attitude target control amount calculation portion according to the first embodiment of the present invention.

FIG. 4 is a block diagram illustrating an example of a functional configuration of the roll attitude target control amount calculation portion 89 according to the present embodiment. As illustrated in FIG. 4, the roll attitude target control amount calculation portion 89 includes a target pitch angle calculation portion 891, a target differential damping gradient calculation portion 893, and a target control amount arithmetic portion 894.

Figure 5:
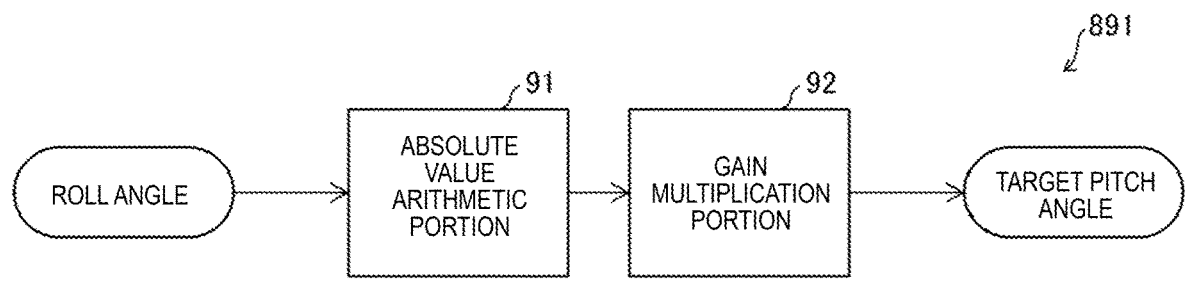
FIG. 5 is a block diagram illustrating an example of a functional configuration of a target pitch angle calculation portion according to the first embodiment of the present invention.

The target pitch angle calculation portion 891 calculates a target pitch angle with reference to the roll angle signal of the vehicle 900. FIG. 5 is a block diagram illustrating an example of a functional configuration of the target pitch angle calculation portion 891 according to the present embodiment. For example, the target pitch angle calculation portion 891 includes an absolute value arithmetic portion 91 and a gain multiplication portion 92, as illustrated in FIG. 5. The absolute value arithmetic portion 91 calculates an absolute value of the roll angle indicated by the roll angle signal and supplies the calculated absolute value to the gain multiplication portion 92. The gain multiplication portion 92 calculates the target pitch angle by multiplying the absolute value of the roll angle supplied from the absolute value arithmetic portion 91 by a gain.

The target differential damping gradient calculation portion 893 calculates a target differential damping gradient ΔC with reference to a difference between the target pitch angle calculated by the target pitch angle calculation portion 891 and the actual pitch angle signal of the vehicle 900. As a result, according to the present embodiment, it is possible to perform a more appropriate suspension control that responds swiftly to changes in steering conditions.

Here, the target differential damping gradient ΔC has a meaning as a sum of a front wheel side target differential damping gradient $\Delta C_{Front}$ and a rear wheel side target differential damping gradient $\Delta C_{Rear}$, as can be seen from the explanation described below.

Figure 6:
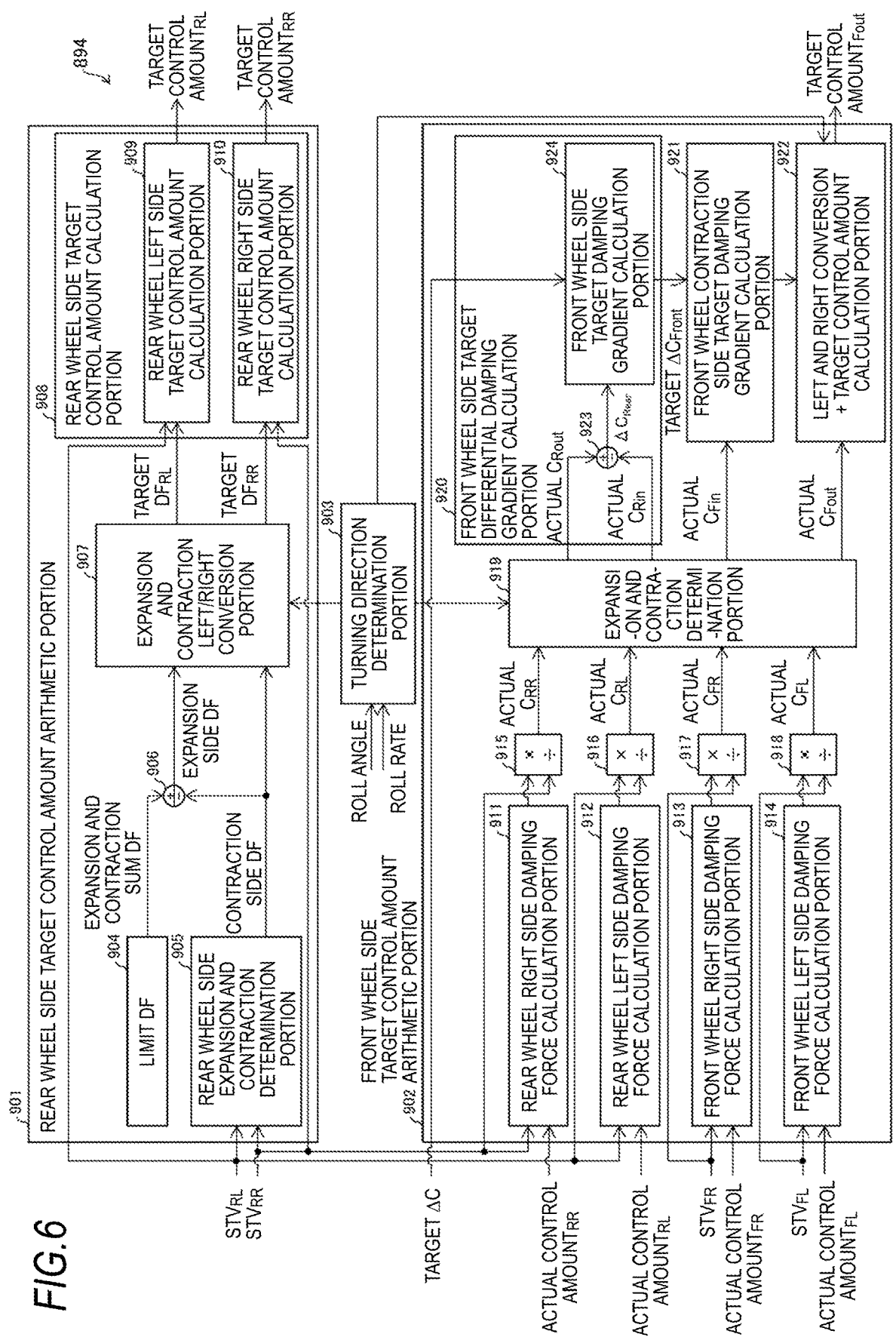
FIG. 6 is a block diagram illustrating an example of a functional configuration of a target control amount arithmetic portion according to the first embodiment of the present invention.

The target control amount arithmetic portion 894 calculates a roll attitude control amount with reference to the target differential damping gradient ΔC calculated by the target differential damping gradient calculation portion 893. FIG. 6 is a block diagram illustrating an example of a functional configuration of the target control amount arithmetic portion 894 according to the present embodiment. As illustrated in FIG. 6, the target control amount arithmetic portion 894 includes a rear wheel side target control amount arithmetic portion 901, a front wheel side target control amount arithmetic portion 902, and a turning direction determination portion 903.

The turning direction determination portion 903 determines a turning direction of the vehicle 900 with reference to the roll angle and the roll rate acquired from the vehicle state estimation portion 670. As described above, the roll angle referred to by the turning direction determination portion 903 may be configured to be acquired from the roll angle sensor. Alternatively, the roll angle may be configured to be obtained by integrating the roll rate calculated by the vehicle state estimation portion 670 with the vehicle state estimation portion 670, and using the roll angle obtained by the integration as the roll angle signal. The turning direction determination portion 903 supplies the determination result of the turning direction of the vehicle 900 to the rear wheel side target control amount arithmetic portion 901 and the front wheel side target control amount arithmetic portion 902.

The rear wheel side target control amount arithmetic portion 901 includes a limit DF storage portion (limit damper force storage portion) 904, a rear wheel side expansion and contraction determination portion 905, a subtraction portion 906, an expansion and contraction left/right conversion portion 907, and a rear wheel side target control amount calculation portion 908.

The limit DF storage portion 904 stores a total value of the magnitude of the damping force on the extension side and the magnitude of the damping force on the contraction side. As an example, the limit DF storage portion 904 stores a total value $F_{Rear}$ of the magnitude of the damping force on the extension side and the magnitude of the damping force on the contraction side on the rear wheel side. The total value $F_{Rear}$ is supplied to the subtraction portion 906.

The rear wheel side expansion and contraction determination portion 905 acquires a stroke speed $STV_{RL}$ of the vehicle wheel 300C on the left side of the rear wheel and a stroke speed $STV_{RR}$ of the vehicle wheel 300D on the right side of the rear wheel from the vehicle state estimation portion 670.

The rear wheel side expansion and contraction determination portion 905 determines which of the vehicle wheel 300C and the vehicle wheel 300D is the extension side and which is the contraction side with reference to the acquired stroke speed $STV_{RL}$ of the vehicle wheel 300C and the stroke speed $STV_{RR}$ of the vehicle wheel 300D.

Further, the rear wheel side expansion and contraction determination portion 905 calculates a damping force $F_{Rout}$ on the contraction side on the rear wheel side with reference to the acquired stroke speed $STV_{RL}$ of the vehicle wheel 300C and the stroke speed $STV_{RR}$ of the vehicle wheel 300D. The rear wheel side expansion and contraction determination portion 905 supplies the damping force $F_{Rout}$ on the contraction side of the rear wheel side to the subtraction portion 906 and the expansion and contraction left/right conversion portion 907.

The subtraction portion 906 calculates a damping force $F_{Rin}$ on the extension side of the rear wheel side with reference to the total value $F_{Rear}$ acquired from the limit DF 904 and the damping force $F_{Rout}$ on the contraction side on the rear wheel side acquired from the rear wheel side expansion and contraction determination portion 905. The subtraction portion 906 supplies the calculated damping force $F_{Rin}$ on the extension side of the rear wheel side to the expansion and contraction left/right conversion portion 907.

The expansion and contraction left/right conversion portion 907 calculates a target damping force $F_{RL}$ of the vehicle wheel 300C and a target damping force $F_{RR}$ of the vehicle wheel 300D with reference to the turning direction of the vehicle 900 acquired from the turning direction determination portion 903, the damping force $F_{Rout}$ on the contraction side of the rear wheel side acquired from the rear wheel side expansion and contraction determination portion 905, and the damping force $F_{Rin}$ on the extension side of the rear wheel side acquired from the subtraction portion 906. The expansion and contraction left/right conversion portion 907 supplies the calculated target damping force $F_{RL}$ of the vehicle wheel 300C and the target damping force $F_{RR}$ of the vehicle wheel 300D to the rear wheel side target control amount calculation portion 908.

The rear wheel side target control amount calculation portion 908 includes a rear wheel left side target control amount calculation portion 909 and a rear wheel right side target control amount calculation portion 910. Further, the rear wheel side target control amount calculation portion 908 acquires the stroke speed $STV_{RL}$ of the vehicle wheel 300C and the stroke speed $STV_{RR}$ of the vehicle wheel 300D from the vehicle state estimation portion 670.

The rear wheel left side target control amount calculation portion 909 calculates a target control amount of the vehicle wheel 300C according to the expansion and contraction of the suspension of the vehicle wheel 300C. More specifically, the rear wheel left side target control amount calculation portion 909 calculates the target control amount of the vehicle wheel 300C with reference to the stroke speed $STV_{RL}$ of the vehicle wheel 300C acquired from the vehicle state estimation portion 670 and the target damping force $F_{RL}$ of the vehicle wheel 300C acquired from the expansion and contraction left/right conversion portion 907.

The rear wheel right side target control amount calculation portion 910 calculates a target control amount of the vehicle wheel 300D according to the expansion and contraction of the suspension of the vehicle wheel 300D. More specifically, the rear wheel right side target control amount calculation portion 910 calculates the target control amount of the vehicle wheel 300D with reference to the stroke speed $STV_{RR}$ of the vehicle wheel 300D acquired from the vehicle state estimation portion 670 and the target damping force $F_{RR}$ of the vehicle wheel 300D acquired from the expansion and contraction left/right conversion portion 907.

As a result, according to the present embodiment, it is possible to perform a more appropriate suspension control that responds swiftly to changes in steering conditions.

The front wheel side target control amount arithmetic portion 902 includes a rear wheel right side damping force calculation portion 911, a rear wheel left side damping force calculation portion 912, a front wheel right side damping force calculation portion 913, a front wheel left side damping force calculation portion 914, multiplication and division portions 915 to 918, an expansion and contraction determination portion 919, a front wheel side target differential damping gradient calculation portion 920, a front wheel contraction side target damping gradient calculation portion 921, and a left and right conversion+target control amount calculation portion 922.

The rear wheel right side damping force calculation portion 911 acquires the stroke speed $STV_{RR}$ of the vehicle wheel 300D from the vehicle state estimation portion 670, and acquires an actual control amount$_{RR}$ of the vehicle wheel 300D from the control amount selection portion 690. The rear wheel right side damping force calculation portion 911 calculates a damping force $F_{RR}$ of the vehicle wheel 300D with reference to the acquired stroke speed $STV_{RR}$ of the vehicle wheel 300D and the actual control amount$_{RR}$ of the vehicle wheel 300D. The rear wheel right side damping force calculation portion 911 supplies the calculated damping force $F_{RR}$ of the vehicle wheel 300D to the multiplication and division portion 915. Here, the "actual control amount" is a control current for a suspension control supplied to the suspension of the vehicle wheel.

The multiplication and division portion 915 calculates a damping gradient $C_{RR}$ of the right side of the rear wheel with reference to the stroke speed $STV_{RR}$ of the vehicle wheel 300D acquired from the vehicle state estimation portion 670 and the damping force $F_{RR}$ of the vehicle wheel 300D acquired from the rear wheel right side damping force calculation portion 911. More specifically, the multiplication and division portion 915 calculates the damping gradient $C_{RR}$ of the right side of the rear wheel by dividing the damping force $F_{RR}$ of the vehicle wheel 300D acquired from the rear wheel right side damping force calculation portion 911 by the stroke speed $STV_{RR}$ of the vehicle wheel 300D acquired from the vehicle state estimation portion 670. The multiplication and division portion 915 supplies the calculated damping gradient $C_{RR}$ of the right side of the rear wheel to the expansion and contraction determination portion 919.

The rear wheel left side damping force calculation portion 912 acquires the stroke speed $STV_{RL}$ of the vehicle wheel 300C from the vehicle state estimation portion 670, and acquires an actual control amount$_{RL}$ of the vehicle wheel 300C from the control amount selection portion 690. The rear wheel left side damping force calculation portion 912 calculates a damping force $F_{RL}$ of the vehicle wheel 300C with reference to the acquired stroke speed $STV_{RL}$ of the vehicle wheel 300C and the actual control amount$_{RL}$ of the vehicle wheel 300C. The rear wheel left side damping force calculation portion 912 supplies the calculated damping force $F_{RL}$ of the vehicle wheel 300C to the multiplication and division portion 916.

The multiplication and division portion 916 calculates a damping gradient $C_{RL}$ of the left side of the rear wheel with reference to the stroke speed $STV_{RL}$ of the vehicle wheel 300C acquired from the vehicle state estimation portion 670 and the damping force $F_{RL}$ of the vehicle wheel 300C acquired from the rear wheel left side damping force calculation portion 912. More specifically, the multiplication and division portion 916 calculates the damping gradient $C_{RL}$ of the left side of the rear wheel by dividing the damping force $F_{RL}$ of the vehicle wheel 300C acquired from the rear wheel left side damping force calculation portion 912 by the stroke speed $STV_{RL}$ of the vehicle wheel 300C acquired from the vehicle state estimation portion 670. The multiplication and division portion 916 supplies the calculated damping gradient $C_{RL}$ of the left side of the rear wheel to the expansion and contraction determination portion 919.

The front wheel right side damping force calculation portion 913 acquires the stroke speed $STV_{FR}$ of the vehicle wheel 300B on the right side of the front wheel from the vehicle state estimation portion 670, and acquires an actual control amount$_{FR}$ from the control amount selection portion 690. The front wheel right side damping force calculation portion 913 calculates a damping force $F_{FR}$ of the vehicle wheel 300B with reference to the acquired stroke speed $STV_{FR}$ of the vehicle wheel 300B and the actual control amount$_{FR}$ of the vehicle wheel 300B. The front wheel right side damping force calculation portion 913 supplies the calculated damping force $F_{FR}$ of the vehicle wheel 300B to the multiplication and division portion 917.

The multiplication and division portion 917 calculates a damping gradient $C_{FR}$ on the right side of the front wheel with reference to the stroke speed $STV_{FR}$ of the vehicle wheel 300B acquired from the vehicle state estimation portion 670 and the damping force $F_{FR}$ of the vehicle wheel 300B acquired from the front wheel right side damping force calculation portion 913. More specifically, the multiplication and division portion 917 calculates the damping gradient $C_{FR}$ on the right side of the front wheel by dividing the damping force $F_{FR}$ of the vehicle wheel 300B acquired from the front wheel right side damping force calculation portion 913 by the stroke speed $STV_{FR}$ of the vehicle wheel 300B acquired from the vehicle state estimation portion 670. The multiplication and division portion 917 supplies the calculated damping gradient $C_{FR}$ on the right side of the front wheel to the expansion and contraction determination portion 919.

The front wheel left side damping force calculation portion 914 acquires the stroke speed $STV_{FL}$ of the vehicle wheel 300A on the left side of the front wheel from the vehicle state estimation portion 670, and acquires an actual control amount$_{FL}$ of the vehicle wheel 300A from the control amount selection portion 690. The front wheel left side damping force calculation portion 914 calculates a damping force $F_{FL}$ of the vehicle wheel 300A with reference to the acquired stroke speed $STV_{FL}$ of the vehicle wheel 300A and the actual control amount$_{FL}$ of the vehicle wheel 300A. The front wheel left side damping force calculation portion 914 supplies the calculated damping force $F_{FL}$ of the vehicle wheel 300A to the multiplication and division portion 918.

The multiplication and division portion 918 calculates a damping gradient $C_{FL}$ on the left side of the front wheel with reference to the stroke speed $STV_{FL}$ of the vehicle wheel 300A acquired from the vehicle state estimation portion 670 and the damping force $F_{FL}$ of the vehicle wheel 300A acquired from the front wheel left side damping force calculation portion 914. More specifically, the multiplication and division portion 918 calculates the damping gradient $C_{FL}$ on the left side of the front wheel by dividing the damping force $F_{FL}$ of the vehicle wheel 300A acquired from the front wheel left side damping force calculation portion 914 by the stroke speed $STV_{FL}$ of the vehicle wheel 300A acquired from the vehicle state estimation portion 670. The multiplication and division portion 918 supplies the calculated damping gradient $C_{FL}$ on the left side of the front wheel to the expansion and contraction determination portion 919.

The expansion and contraction determination portion 919 determines which of the damping gradient $C_{RR}$ and the damping gradient $C_{RL}$ corresponds to a damping gradient $C_{Rout}$ of a contraction side wheel on the rear wheel side and which corresponds to a damping gradient $C_{Rin}$ of an extension side wheel on the rear wheel side with reference to the turning direction of the vehicle 900 acquired from the turning direction determination portion 903, the damping gradient $C_{RR}$ acquired from the multiplication and division portion 915, and the damping gradient $C_{RL}$ acquired from the multiplication and division portion 916. The expansion and contraction determination portion 919 supplies the determined damping gradient $C_{Rout}$ of the contraction side wheel on the rear wheel side and the damping gradient $C_{Rin}$ of the extension side wheel on the rear wheel side to the front wheel side target differential damping gradient calculation portion 920.

Further, the expansion and contraction determination portion 919 determines a damping gradient $C_{Fout}$ of a contraction side wheel on the front wheel side and a damping gradient $C_{Fin}$ of an extension side wheel on the front wheel side with reference to the turning direction of the vehicle 900 acquired from the turning direction determination portion 903, the damping gradient $C_{FR}$ acquired from the multiplication and division portion 917, and the damping gradient $C_{FL}$ acquired from the multiplication and division portion 918. The expansion and contraction determination portion 919 supplies the damping gradient $C_{Fout}$ of the contraction side wheel on the front wheel side to the left and right conversion+target control amount calculation portion 922, and supplies the damping gradient $C_{Fin}$ of the extension side wheel to the front wheel contraction side target damping gradient calculation portion 921.

The front wheel side target differential damping gradient calculation portion 920 includes a subtraction portion 923 and a front wheel side target damping gradient calculation portion 924. Further, the front wheel side target differential damping gradient calculation portion 920 acquires the target differential damping gradient $\Delta C$ from the target differential damping gradient calculation portion 893.

The subtraction portion 923 calculates a rear wheel side differential damping gradient $\Delta C_{Rear}$ with reference to the rear wheel extension side damping gradient $C_{Rin}$ and the rear wheel contraction side damping gradient $C_{Rout}$ acquired from the expansion and contraction determination portion 919. More specifically, the subtraction portion 923 calculates the rear wheel side differential damping gradient $\Delta C_{Rear}$ by subtracting the rear wheel extension side damping gradient $C_{Rin}$ from the rear wheel contraction side damping gradient $C_{Rout}$. The subtraction portion 923 supplies the calculated rear wheel side differential damping gradient $\Delta C_{Rear}$ to the front wheel side target damping gradient calculation portion 924.

The front wheel side target damping gradient calculation portion 924 calculates a front wheel side differential damping gradient $\Delta C_{Front}$ with reference to the target differential damping gradient $\Delta C$ acquired from the target differential damping gradient calculation portion 893 and the rear wheel side differential damping gradient $\Delta C_{Rear}$ acquired from the subtraction portion 923. As a result, according to the present embodiment, it is possible to perform a more appropriate suspension control that responds swiftly to changes in steering conditions. The front wheel side target damping gradient calculation portion 924 supplies the calculated front wheel side differential damping gradient $\Delta C_{Front}$ to the front wheel contraction side target damping gradient calculation portion 921.

The front wheel contraction side target damping gradient calculation portion 921 calculates a target damping gradient $C_{Fout}$ of the extension side wheel of the front wheel side with reference to the damping gradient $C_{Fin}$ of the extension side wheel acquired from the expansion and contraction determination portion 919 and the front wheel side differential damping gradient $\Delta C_{Front}$ acquired from the front wheel side target damping gradient calculation portion 924. The front wheel contraction side target damping gradient calculation portion 921 supplies the calculated target damping gradient $C_{Fout}$ of the extension side wheel of the front wheel side to the left and right conversion+target control amount calculation portion 922.

The left and right conversion+target control amount calculation portion 922 calculates the target control amount of the extension side wheel on the front wheel side with reference to the turning direction of the vehicle 900 acquired from the turning direction determination portion 903, the damping gradient $C_{Fout}$ of the contraction side wheel of the front wheel side acquired from the expansion and contraction determination portion 919, and the target damping gradient $C_{Fout}$ of the extension side wheel of the front wheel side acquired from the front wheel contraction side target damping gradient calculation portion 921. As a result, according to the present embodiment, it is possible to perform a more appropriate suspension control that responds swiftly to changes in steering conditions.

In addition, the roll attitude target control amount calculation portion 89 according to the present embodiment can calculate a roll attitude target control amount in accordance with an actual condition of the vehicle 900 by calculating the damping force of each vehicle wheel 300 using the actual control amount of each vehicle wheel 300. As a result, according to the present embodiment, it is possible to perform the suspension control with higher accuracy.

(Suspension Control Method)

Figure 7:
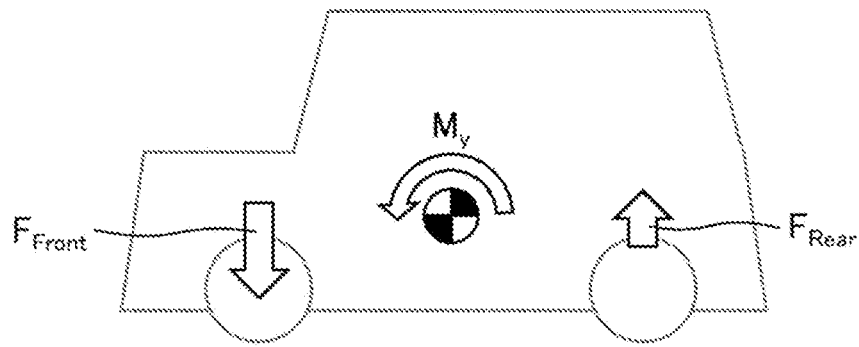
FIG. 7 is a schematic view illustrating a mechanism for generating a pitch moment according to the first embodiment of the present invention.
Figure 8:
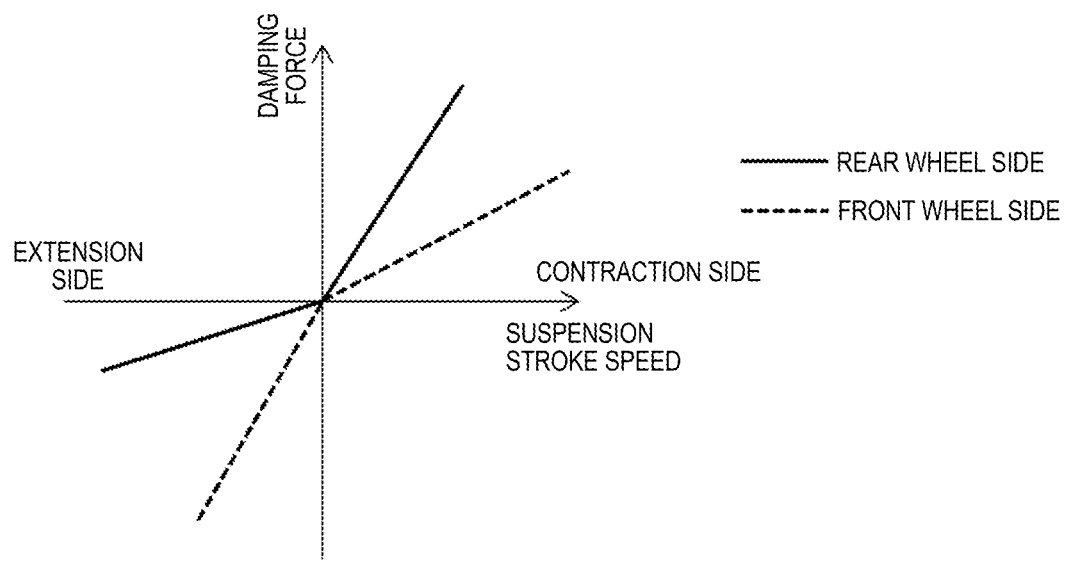
FIG. 8 is a graph illustrating an example of a relationship between damping forces of a front wheel and a rear wheel and a suspension stroke speed according to the first embodiment of the present invention.
Figure 9:
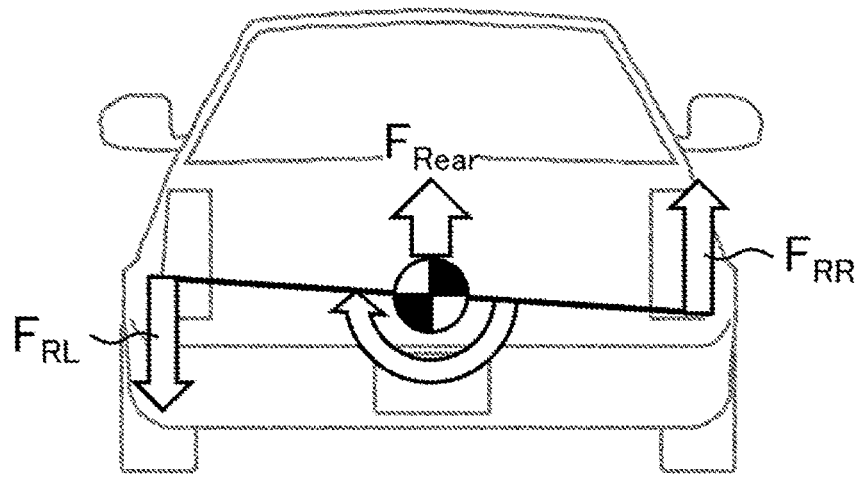
FIG. 9 is a schematic view illustrating a resultant force of damping forces of left and right wheels on a rear wheel side according to the first embodiment of the present invention.
Figure 10:
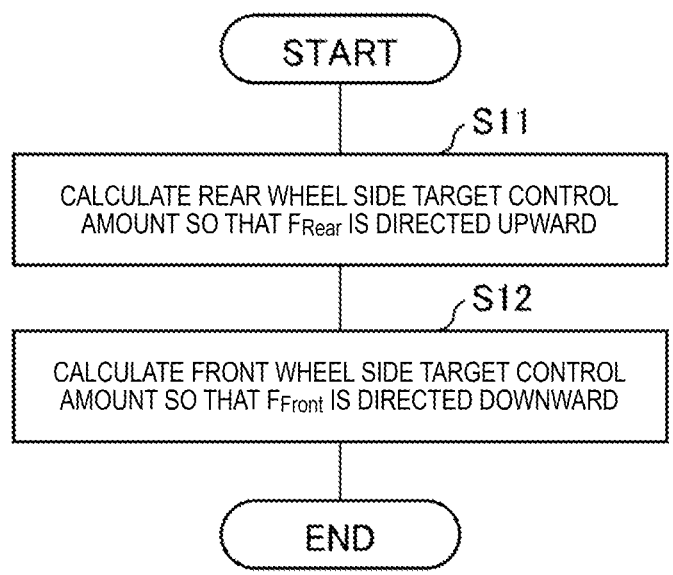
FIG. 10 is a flowchart illustrating a flow of damping force control according to the first embodiment of the present invention.
Figure 11:
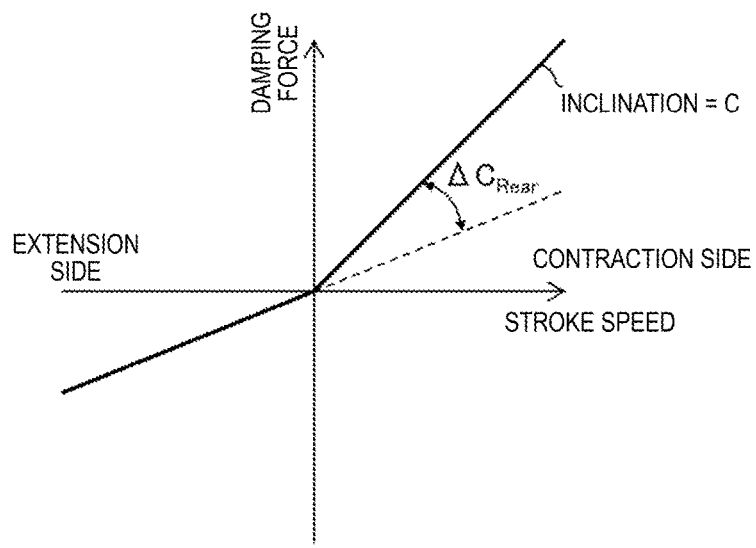
FIG. 11 is a graph illustrating a definition of a rear wheel side target differential damping gradient according to the first embodiment of the present invention.

In the following, a suspension control method in the roll attitude target control amount calculation portion 89 will be described with reference to FIGS. 7 to 10. FIG. 7 is a schematic view illustrating a mechanism for generating a pitch moment according to the present embodiment. FIG. 8 is a graph illustrating an example of a relationship between the damping forces of the front wheel and the rear wheel and a suspension stroke speed according to the present embodiment. FIG. 9 is a schematic view illustrating a resultant force of the damping forces of the left and right wheels on the rear wheel side according to the present embodiment. FIG. 10 is a flowchart illustrating a flow of damping force control according to the present embodiment. FIG. 11 is a graph illustrating a definition of the rear wheel side target differential damping gradient according to the present embodiment.

In the following, in a state quantity indicating the state of the vehicle 900, a state quantity on the front wheel side and a state quantity on the rear wheel side may be represented by adding the reference letters "Front" and "Rear", respectively. Also, to use a state quantity on the right side of the front wheel, a state quantity on the left side of the front wheel, a state quantity on the right side of the rear wheel, and a state quantity on the left side of the rear wheel, these may be represented by adding the reference letters "FR", "FL", "RR", and "RL", respectively. Also, when the vehicle 900 is turning, the front wheel located inside the turn, the front wheel located outside the turn, the rear wheel located inside the turn, and the rear wheel located outside the turn may be represented by adding the reference letters "Fin", "Fout", "Rin", and "Rout", respectively.

First, when a driver turns the steering member 410, the steering torque is generated and the steering torque signal is generated by the turning operation of the steering member 410 by the driver. The vehicle wheel 300A and the vehicle wheel 300B are steered so as to have a steering angle according to the generated steering torque signal, and the vehicle 900 turns according to the steering angle.

When the vehicle 900 is turning, a damping force is generated according to a displacement speed of absorbers (front wheel side absorber and rear wheel side absorber) due to a roll motion, and a force which pushes up or pushes down an axle is generated according to a difference between the damping force on the extension side and the damping force on the contraction side.

Here, with reference to FIG. 10, the flow of controlling the damping force according to the present embodiment will be described.

(Step S11)

The roll attitude target control amount calculation portion 89 controls the damping forces of the vehicle wheel 300C and the vehicle wheel 300D so as to generate a force for pushing up the axle in the rear wheel side absorber. More specifically, the roll attitude target control amount calculation portion 89 calculates a rear wheel side target control amount so that a resultant force $F_{Rear}$ of the damping forces of the vehicle wheel 300C and the vehicle wheel 300D becomes an upward force.

(Step S12)

Next, the roll attitude target control amount calculation portion 89 controls the damping forces of the vehicle wheel 300A and the vehicle wheel 300B so as to generate a force for pushing down the axle in the front wheel side absorber. More specifically, the roll attitude target control amount calculation portion 89 calculates a front wheel side target control amount so that a resultant force $F_{Front}$ of the damping forces of the vehicle wheel 300A and the vehicle wheel 300B becomes a downward force.

Here, a method for controlling the damping forces of the vehicle wheel 300A, the vehicle wheel 300B, the vehicle wheel 300C, and the vehicle wheel 300D in the roll attitude target control amount calculation portion 89 will be described by changing the drawings. As illustrated in FIG. 8, the roll attitude target control amount calculation portion 89 controls the magnitude of the damping force $F_{Fout}$ on the extension side to be larger than the magnitude of the damping force $F_{Fin}$ on the contraction side in the vehicle wheel 300A and the vehicle wheel 300B for the suspension stroke speed of the same size. Further, as illustrated in FIG. 8, the roll attitude target control amount calculation portion 89 controls the magnitude of the damping force $F_{Fout}$ on the contraction side to be larger than the magnitude of the damping force $F_{Rin}$ on the extension side in the vehicle wheel 300C and the vehicle wheel 300D for the suspension stroke speed of the same size.

As an example, as illustrated in FIG. 9, when the vehicle 900 is turning left, the damping force $F_{Rin}$ ($F_{RL}$) on the extension side is generated on the vehicle wheel 300C inside the turn, and damping force $F_{Fout}$ ($F_{RR}$) on the contraction side is generated on the vehicle wheel 300D outside the turn. As described above, since the roll attitude target control amount calculation portion 89 controls so that the magnitude of the damping force $F_{Fout}$ on the contraction side is larger than the magnitude of the damping force $F_{Rin}$ on the expansion side, the resultant force $F_{Rear}$ of the damping forces of the vehicle wheel 300C and the vehicle wheel 300D during turning is the force that pushes up the axle.

On the contrary, in terms of the damping forces on the front wheel side when the vehicle 900 is turning left, the damping force $F_{Fin}$ ($F_{FL}$) on the extension side is generated in the vehicle wheel 300A inside the turn, and the damping force $F_{Fout}$ ($F_{FR}$) on the contraction side is generated in the vehicle wheel 300B outside the turn. As described above, since the roll attitude target control amount calculation portion 89 controls so that the magnitude of the damping force $F_{Fin}$ on the extension side is larger than the magnitude of the damping force $F_{Fout}$ on the contraction side, the resultant force $F_{Front}$ of the damping forces of the vehicle wheel 300A and the vehicle wheel 300B during turning becomes the force that pushes down the axle.

A configuration in which the roll attitude target control amount calculation portion 89 controls so that the resultant force $F_{Rear}$ of the damping forces of the vehicle wheel 300C and the vehicle wheel 300D during turning becomes the force that pushes up the axle is described above, but the present embodiment is not limited to this. As an example, the roll attitude target control amount calculation portion 89 may be configured so that the resultant force of the damping forces of the vehicle wheel 300C and the vehicle wheel 300D during turning becomes zero. More specifically, the roll attitude target control amount calculation portion 89 controls so that the magnitude of the damping force $F_{Rout}$ on the contraction side and the magnitude of the damping force $F_{Rin}$ on the extension side are the same in the vehicle wheel 300C and the vehicle wheel 300D for the suspension stroke speed of the same size.

In the present embodiment, as described above, the roll attitude target control amount calculation portion 89 controls the damping forces of the vehicle wheel 300A, the vehicle wheel 300B, the vehicle wheel 300C, and the vehicle wheel 300D, so that a pitch moment $M_y$ is generated by the damping force difference between the front and rear wheels. More specifically, as illustrated in FIG. 7, the axle on the front wheel side of the vehicle 900 is pushed down, and the rear wheel side of the vehicle 900 is pushed up, so that the pitch moment $M_y$ is generated. As a result, when the vehicle 900 is turning, a combined motion of a roll motion and a pitch motion is generated in the vehicle 900. In addition, the pitch angle of the vehicle 900 can be easily created, the responsiveness of the control of the vehicle 900 is improved, and the driver of the vehicle 900 can feel a favorable turning feeling.

Further, in the present embodiment, it is possible to carry out control for further improving the turning feeling with reference to the roll angle and the pitch angle. For example, the suspension is controlled so that a time difference between a peak of the roll angle and a peak of the pitch angle in the vehicle 900 is smaller. This control allows the driver of the vehicle 900 to feel the favorable turning feeling.

More specifically, the target differential damping gradient calculation portion 893 includes a pitch moment arithmetic portion (not illustrated), and calculates the pitch moment with reference to the roll angle and the pitch angle of the vehicle 900. The roll attitude target control amount calculation portion 89 calculates a roll attitude target control amount which makes a difference between the phase of the roll angle in the vehicle 900 and the phase of the pitch angle obtained from the pitch moment smaller with reference to the roll angle of the vehicle 900 and the pitch moment calculated by the pitch moment arithmetic portion.

Here, in the calculation of the roll attitude target control amount according to the roll attitude target control amount calculation portion 89, the difference between the phase of the roll angle and the phase of the pitch angle can be appropriately set within a range sufficiently small for the driver to get the favorable turning feeling. From the viewpoint that the driver gets the favorable turning feeling, the smaller the difference, the more preferable, for example, it is preferably ¼ cycle or less, more preferably ⅛ cycle or less, and most preferably zero. The "cycle" may be a roll angle cycle or a pitch angle cycle, but from the above viewpoint, the "cycle" is preferably a smaller cycle of the roll angle cycle and the pitch angle cycle.

That is, it can be rephrased that the roll attitude target control amount calculation portion 89 calculates the target control amount so that a phase difference between the cycle of the phase of the roll angle of the vehicle 900 and the cycle of the phase of the pitch angle of the vehicle 900 is within ¼ cycle. Further, it can be rephrased that the roll attitude target control amount calculation portion 89 calculates the target control amount so that the phase difference between the cycle of the phase of the roll angle of the vehicle 900 and the cycle of the phase of the pitch angle of the vehicle 900 is within ⅛ cycle. Also, it can be rephrased that the roll attitude target control amount calculation portion 89 calculates the target control amount so that the cycle of the phase of the roll angle of the vehicle 900 and the cycle of the phase of the pitch angle of the vehicle 900 are synchronized.

(Definition of Rear Wheel Side Target Differential Damping Gradient $\Delta C_{Rear}$)

In the following, the definition of the rear wheel side target differential damping gradient $\Delta C_{Rear}$ will be described with reference to FIG. 11. A damping gradient C indicates an inclination of a graph illustrating the damping force with respect to the suspension stroke speed. As illustrated in FIG. 11, the rear wheel side target differential damping gradient $\Delta C_{Rear}$ represents a difference in inclination between a solid line indicating the damping gradient $C_{Rout}$ of the contraction side wheel on the rear wheel side and a broken line indicating the damping gradient $C_{Rin}$ of the extension side wheel on the rear wheel side.

Second Embodiment

Hereinafter, a second embodiment of the present invention will be described in detail. For convenience of explanation, the same reference numerals are given to the members having the same functions as the members described in the above-described embodiment, and the description thereof will not be repeated.

Figure 12:
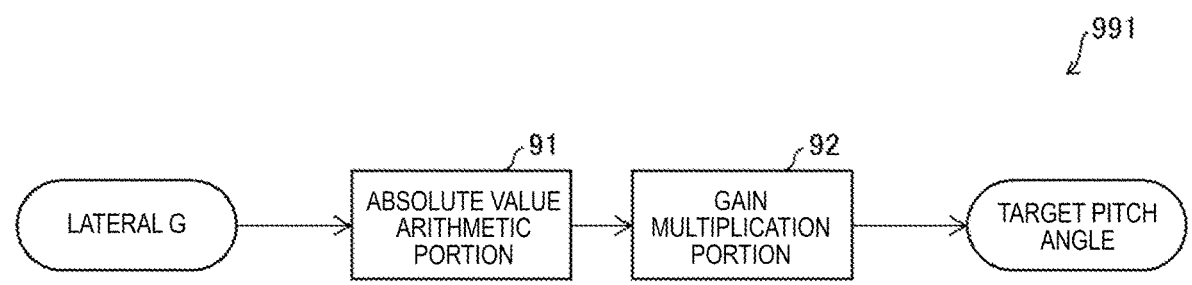
FIG. 12 is a block diagram illustrating an example of a functional configuration of a target pitch angle calculation portion according to a second embodiment of the present invention.

The present embodiment is different from the first embodiment in that a target pitch angle calculation portion 991 is provided instead of the target pitch angle calculation portion 891. FIG. 12 is a block diagram illustrating an example of a functional configuration of the target pitch angle calculation portion 991 according to the present embodiment. The target pitch angle calculation portion 991 calculates the target pitch angle with reference to a lateral G signal indicating the lateral acceleration of the vehicle 900. More specifically, the absolute value arithmetic portion 91 calculates an absolute value of the lateral G indicated by the lateral G signal and supplies the calculated absolute value to the gain multiplication portion 92. The gain multiplication portion 92 calculates the target pitch angle by multiplying the absolute value of the lateral G supplied from the absolute value arithmetic portion 91 by the gain. As a result, according to the present embodiment, it is possible to perform a more appropriate suspension control that responds swiftly to changes in steering conditions.

Third Embodiment

Hereinafter, a third embodiment of the present invention will be described in detail. For convenience of explanation, the same reference numerals are given to the members having the same functions as the members described in the above-described embodiment, and the description thereof will not be repeated.

Figure 13:
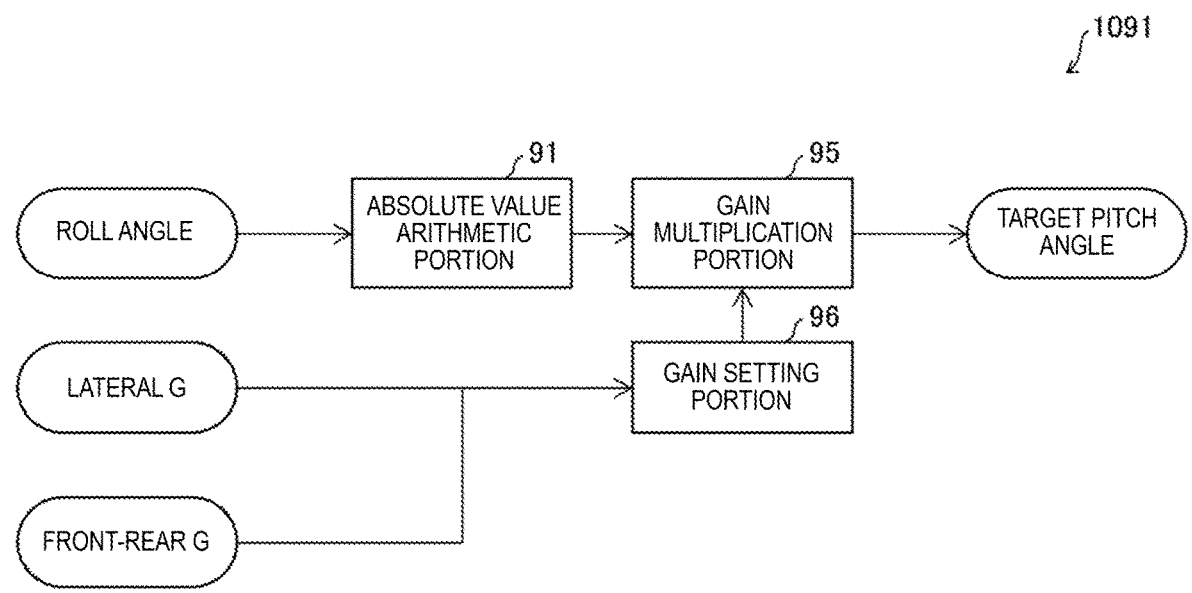
FIG. 13 is a block diagram illustrating an example of a functional configuration of a target pitch angle calculation portion according to a third embodiment of the present invention.

The present embodiment is different from the first embodiment in that a target pitch angle calculation portion 1091 is provided instead of the target pitch angle calculation portion 891. FIG. 13 is a block diagram illustrating an example of a functional configuration of the target pitch angle calculation portion 1091 according to the present embodiment. The target pitch angle calculation portion 1091 includes a gain multiplication portion 95 instead of the gain multiplication portion 92. The target pitch angle calculation portion 1091 further includes a gain setting portion 96. In these respects, the target pitch angle calculation portion 1091 is different from the target pitch angle calculation portion 891 in the first embodiment. The gain multiplication portion 95 and the gain setting portion 96 form a gain change portion.

The gain setting portion 96 sets a gain value with reference to at least one of a lateral G signal indicating the lateral acceleration of the vehicle 900 and a front-rear G signal indicating the front-rear acceleration of the vehicle 900. The gain multiplication portion 95 refers to the gain value set by the gain setting portion 96, and changes the gain to be multiplied according to the gain value. Then, the gain multiplication portion 95 calculates the target pitch angle by multiplying the absolute value of the roll angle calculated by the absolute value arithmetic portion 91 by the changed gain.

When the road surface has the unevenness, the unevenness causes the lateral G and front-rear G of the vehicle 900 to fluctuate directly or indirectly via steering torque or the like. Therefore, it is advantageous to refer to the lateral G and the front-rear G of the vehicle 900 for calculating the target pitch angle from a viewpoint of performing a suspension control that appropriately reflects a road surface condition.

[Example of Implementation by Software]

A control block (roll attitude target control amount calculation portion 89) of the ECU 600 may be realized by a logic circuit (hardware) formed in an integrated circuit (IC chip) or the like, or may be realized by software using a central processing unit (CPU).

In the latter case, the ECU 600 includes a CPU which executes instructions of a program which is software that realizes each function, a read only memory (ROM) or storage device (referred to as a "recording medium") in which the above-described programs and various kinds of data are readably recorded by a computer (or CPU), a random access memory (RAM) into which the above-described program is loaded, and the like. Then, an object of the present invention is achieved by the computer (or CPU) reading the above-described program from the recording medium and executing the program. As the recording medium described above, a "non-temporary tangible medium", for example, a tape, a disk, a card, a semiconductor memory, a programmable logic circuit, or the like can be used. Further, the program described above may be supplied to the computer via any transmission medium (communication network, broadcast wave, and the like) capable of transmitting the program. The present invention can also be realized in a form of a data signal embedded in a carrier wave, in which the above-described program is embodied by electronic transmission.

[Additional Notes]

The present invention is not limited to the above-described embodiments, and various modifications can be made within the scope of the claims. Also, the technical scope of the present invention includes embodiments obtained by appropriately combining the technical means disclosed in the different embodiments.

What is claimed is:

1. A suspension control device configured to control a damping force of a suspension of a vehicle, comprising:
    a target control amount calculation portion configured to set a target control amount referred to when controlling the damping force of the suspension such that;
        a cycle of a phase of a roll angle of the vehicle and a cycle of a phase of a pitch angle of the vehicle approach a synchronous state,
        a magnitude of a damping force on an extension side is larger than a magnitude of a damping force on a contraction side on a front wheel side of the vehicle, and
        a magnitude of a damping force on a contraction side is equal to or larger than a magnitude of a damping force on an extension side on a rear wheel side of the vehicle,
    wherein the target control amount calculation portion includes;
        a target pitch angle calculation portion configured to calculate a target pitch angle with reference to a roll angle signal of the vehicle,
        a target differential damping gradient calculation portion configured to calculate a target differential damping gradient with reference to the target pitch angle and an actual pitch angle signal of the vehicle, and
        a front wheel side target differential damping gradient calculation portion configured to calculate a front wheel side target differential damping gradient with reference to a rear wheel side differential damping gradient and the target difference damping gradient, the rear wheel side differential damping gradient being calculated by subtracting an actual damping gradient for an extension side wheel on the rear wheel side from an actual damping gradient for a contraction side wheel on the rear wheel side,
    wherein the actual damping gradient for the contraction side wheel is calculated with reference to a stroke speed of the contraction side wheel and a damping force of the contraction side wheel, and
    wherein the actual damping gradient for the extension side wheel is calculated with reference to a stroke speed of the extension side wheel and a damping force of the extension side wheel.

2. The suspension control device according to claim 1, wherein
    the target control amount calculation portion includes,
        a rear wheel side expansion and contraction determination portion configured to determine expansion and contraction of each suspension of left and right wheels on the rear wheel side with reference to each suspension stroke speed of the left and right wheels on the rear wheel side, and
        a rear wheel side target control amount calculation portion configured to calculate a target control amount of each of the left and right wheels on the rear wheel side according to the expansion and contraction of each suspension of the left and right wheels on the rear wheel side.

3. The suspension control device according to claim 1, wherein
    the target pitch angle calculation portion includes,
        a gain multiplication portion configured to calculate the target pitch angle by multiplying a roll angle signal by a gain, and
        a gain setting portion configured to set a value of the gain by referring to either a lateral acceleration or a front-rear acceleration.

4. The suspension control device according to claim 1, wherein
    the target control amount calculation portion includes,
        a front wheel contraction side target damping gradient calculation portion configured to calculate a target damping gradient of a contraction side wheel on a front wheel side with reference to the front wheel side target differential damping gradient and an actual damping gradient of an extension side wheel on the front wheel side.

5. The suspension control device according to claim 2, wherein
    the target pitch angle calculation portion includes,
        a gain multiplication portion configured to calculate the target pitch angle by multiplying a roll angle signal by a gain, and
        a gain setting portion configured to set a value of the gain by referring to either a lateral acceleration or a front-rear acceleration.

6. The suspension control device according to claim 2, wherein
    the target control amount calculation portion includes,
        a front wheel contraction side target damping gradient calculation portion configured to calculate a target damping gradient of a contraction side wheel on a front wheel side with reference to the front wheel side target differential damping gradient and an actual damping gradient of an extension side wheel on the front wheel side.

7. The suspension control device according to claim 3, wherein
    the target control amount calculation portion includes,
        a front wheel contraction side target damping gradient calculation portion configured to calculate a target damping gradient of a contraction side wheel on a front wheel side with reference to the front wheel side target differential damping gradient and an actual damping gradient of an extension side wheel on the front wheel side.

8. The suspension control device according to claim 5, wherein
the target control amount calculation portion includes,
a front wheel contraction side target damping gradient calculation portion configured to calculate a target damping gradient of a contraction side wheel on a front wheel side with reference to the front wheel side target differential damping gradient and an actual damping gradient of an extension side wheel on the front wheel side.

9. A suspension control device configured to control a damping force of a suspension of a vehicle, comprising:
a target control amount calculation portion configured to set a target control amount referred to when controlling the damping force of the suspension such that;
a cycle of a phase of a roll angle of the vehicle and a cycle of a phase of a pitch angle of the vehicle approach a synchronous state,
a magnitude of a damping force on an extension side is larger than a magnitude of a damping force on a contraction side on a front wheel side of the vehicle, and
a magnitude of a damping force on a contraction side is equal to or larger than a magnitude of a damping force on an extension side on a rear wheel side of the vehicle, wherein the target control amount calculation portion includes;
a target pitch angle calculation portion which calculates a target pitch angle with reference to a lateral acceleration of the vehicle,
a target differential damping gradient calculation portion which calculates a target differential damping gradient with reference to the target pitch angle and an actual pitch angle signal of the vehicle, and
a front wheel side target differential damping gradient calculation portion configured to calculate a front wheel side target differential damping gradient with reference to a rear wheel side differential damping gradient and the target difference damping gradient, the rear wheel side differential damping gradient being calculated by subtracting an actual damping gradient for an extension side wheel on the rear wheel side from an actual damping gradient for a contraction side wheel on the rear wheel side,
wherein the actual damping gradient for the contraction side wheel is calculated with reference to a stroke speed of the contraction side wheel and a damping force of the contraction side wheel, and
wherein the actual damping gradient for the extension side wheel is calculated with reference to a stroke speed of the extension side wheel and a damping force of the extension side wheel.

10. The suspension control device according to claim 9, wherein
the target control amount calculation portion includes,
a rear wheel side expansion and contraction determination portion configured to determine expansion and contraction of each suspension of left and right wheels on the rear wheel side with reference to each suspension stroke speed of the left and right wheels on the rear wheel side, and
a rear wheel side target control amount calculation portion configured to calculate a target control amount of each of the left and right wheels on the rear wheel side according to the expansion and contraction of each suspension of the left and right wheels on the rear wheel side.

11. The suspension control device according to claim 9, wherein
the target control amount calculation portion includes,
a front wheel contraction side target damping gradient calculation portion configured to calculate a target damping gradient of a contraction side wheel on a front wheel side with reference to the front wheel side target differential damping gradient and an actual damping gradient of an extension side wheel on the front wheel side.

12. The suspension control device according to claim 10, wherein
the target control amount calculation portion includes,
a front wheel contraction side target damping gradient calculation portion configured to calculate a target damping gradient of a contraction side wheel on a front wheel side with reference to the front wheel side target differential damping gradient and an actual damping gradient of an extension side wheel on the front wheel side.

13. A suspension device comprising:
a suspension of a vehicle; and
a control portion configured to control a damping force of the suspension,
wherein the control portion includes a target control amount calculation portion configured to set a target control amount referred to when controlling the damping force of the suspension such that;
a cycle of a phase of a roll angle of the vehicle and a cycle of a phase of a pitch angle of the vehicle approach a synchronous state,
a magnitude of a damping force on an extension side is larger than a magnitude of a damping force on a contraction side on a front wheel side of the vehicle, and
a magnitude of a damping force on a contraction side is equal to or larger than a magnitude of a damping force on an extension side on a rear wheel side of the vehicle, and
wherein the target control amount calculation portion includes;
a target pitch angle calculation portion configured to calculate a target pitch angle with reference to a roll angle signal of the vehicle,
a target differential damping gradient calculation portion configured to calculate a target differential damping gradient with reference to the target pitch angle and an actual pitch angle signal of the vehicle, and
a front wheel side target differential damping gradient calculation portion configured to calculate a front wheel side target differential damping gradient with reference to a rear wheel side differential damping gradient and the target difference damping gradient, the rear wheel side differential damping gradient being calculated by subtracting an actual damping gradient for an extension side wheel on the rear wheel side from an actual damping gradient for a contraction side wheel on the rear wheel side,
wherein the actual damping gradient for the contraction side wheel is calculated with reference to a stroke speed of the contraction side wheel and a damping force of the contraction side wheel, and
wherein the actual damping gradient for the extension side wheel is calculated with reference to a stroke speed of the extension side wheel and a damping force of the extension side wheel.

14. A suspension device comprising:
a suspension of a vehicle; and
a control portion configured to control a damping force of the suspension,
wherein the control portion includes a target control amount calculation portion configured to set a target control amount referred to when controlling the damping force of the suspension such that;
- a cycle of a phase of a roll angle of the vehicle and a cycle of a phase of a pitch angle of the vehicle approach a synchronous state,
- a magnitude of a damping force on an extension side is larger than a magnitude of a damping force on a contraction side on a front wheel side of the vehicle, and
- a magnitude of a damping force on a contraction side is equal to or larger than a magnitude of a damping force on an extension side on a rear wheel side of the vehicle, and wherein the target control amount calculation portion includes;
- a target pitch angle calculation portion configured to calculate a target pitch angle with reference to a lateral acceleration of the vehicle,
- a target differential damping gradient calculation portion configured to calculate a target differential damping gradient with reference to the target pitch angle and an actual pitch angle signal of the vehicle, and
- a front wheel side target differential damping gradient calculation portion configured to calculate a front wheel side target differential damping gradient with reference to a rear wheel side differential damping gradient and the target difference damping gradient, the rear wheel side differential damping gradient being calculated by subtracting an actual damping gradient for an extension side wheel on the rear wheel side from an actual damping gradient for a contraction side wheel on the rear wheel side, wherein the actual damping gradient for the contraction side wheel is calculated with reference to a stroke speed of the contraction side wheel and a damping force of the contraction side wheel, and wherein the actual damping gradient for the extension side wheel is calculated with reference to a stroke speed of the extension side wheel and a damping force of the extension side wheel.

* * * * *